United States Patent Office 2,920,779
Patented Jan. 12, 1960

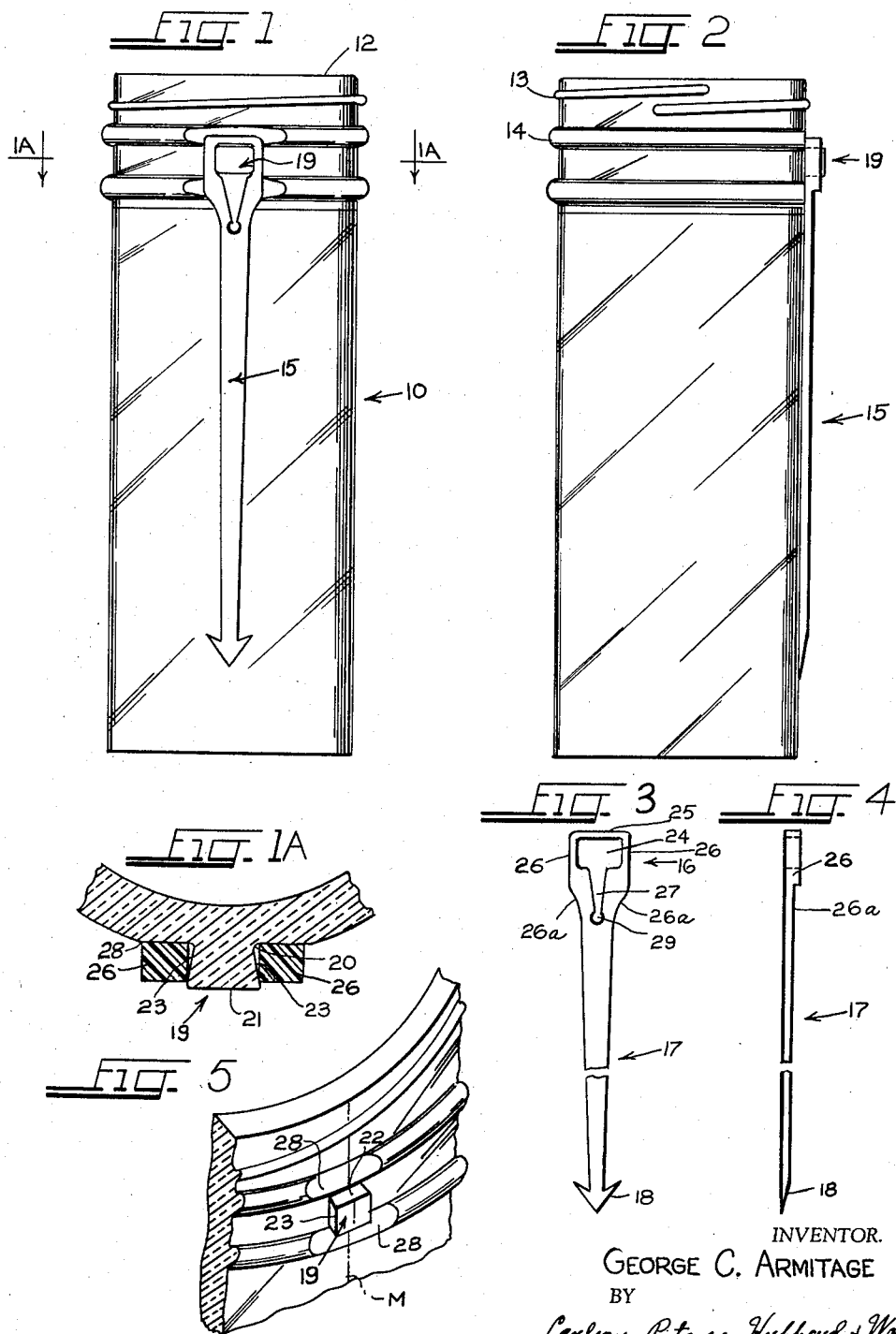

2,920,779

JAR AND IMPLEMENT COMBINATION

George C. Armitage, Skokie, Ill.

Application October 30, 1956, Serial No. 619,185

2 Claims. (Cl. 215—100)

The present invention relates to containers and more particularly to jars for cherries, olives and the like.

In the past, removal of cherries, olives and the like from the jar in which they were packed has required use of an implement such as table fork, spoon or the like which may not be conveniently accessible and which is not particularly well suited for the purpose. It is a general object of the present invention to provide a combined jar and spearing implement, together with novel means for securing the implement to the jar. It is another object to provide an arrangement for fastening the implement on the side of the jar which is tight and secure and which enables the combination to be packed, stacked and handled with no more care than that usually exercised in handling the jars alone but which provides for easy removal and replacement incident to table use. It is a more detailed object to provide a combined jar and implement in which the implement snaps into a firmly seated position on the jar in which it conforms to the wall of the jar in a safely out-of-the-way position with no interfering projections.

It is a further object of the invention to provide a fastening means which is integral with the jar and implement respectively and which therefore does not require any auxiliary piece or attachment. It is a more specific object to provide a jar having a novel protuberance or lug which may be formed integrally with the jar when the jar is molded without use of special equipment. Consequently, jars employing the present invention may be made at low cost, a cost substantially the same as that of more conventional glassware. Similarly, implements constructed in accordance with the present teachings may be cheaply made by injection molding techniques. Finally, it is an object to provide a jar and implement combination which is attractive and which acts to stimulate sales in a highly competitive field. Other objects and advantages will become apparent upon reading the attached detailed description and upon reference to the drawings in which:

Figure 1 is a front view of a jar and implement embodying the present invention.

Fig. 1a is a fragmentary cross section taken along the line 1a—1a in Fig. 1.

Fig. 2 is a side view of the jar and implement shown in Fig. 1.

Fig. 3 and Fig. 4 are front and side views respectively of the implement.

Fig. 5 is a fragmentary perspective view of the jar.

Although the invention has been shown and described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

Turning now to the drawings, initially Figs. 1 and 2, there is illustrated a glass jar 10 of the type commonly used for containing olives, cherries, and the like. The jar shown is straight sided characterized by a tall, slender appearance and has a wide mouth 12 surrounded by a threaded portion 13 for receiving a screw lid (not shown). Two raised bands 14 formed integral with the jar encircle the jar below the threaded portion 13 giving added strength and a more pleasing appearance to the jar.

Shown attached to the jar in Figs. 1 and 2, and separately in Figs. 3 and 4, is an implement 15 for use in removing articles from the jar. As shown, this implement is very nearly as long as the jar is high, permitting it to be used in removing articles from the bottom of the jar, and has at its top end a flat handle portion 16 contiguous with a lower straight elongated spear portion 17 terminating in a somewhat barbed point 18. In use, an article in the jar is impaled on the implement 15, by stabbing the point 18 into or through it, and then easily removed from the jar.

In accordance with the present invention there is provided a new and novel construction of jar and implement in which the parts and elements of both the jar and the implement cooperate to establish a snap-on connection between the two. For this purpose there is provided a receiving element integrally formed on the side of the jar for receiving the implement, and resilient means formed integral with the implement for engaging the receiving element of the jar. Removal or replacement of the implement, that is, disconnecting it from or connecting it to the jar, is accomplished by deforming the resilient engaging element of the implement sufficiently to overcome the physical restraint or obstruction between the members.

To constitute a receiving element there is provided an outwardly extending protuberance integrally formed on the side of the jar. In the present embodiment this protuberance is illustrated as being an outwardly protruding lug 19 having a base portion or neck 20 and a head portion 21 with spaced horizontal top and bottom walls 22 and opposed vertical side walls 23, which flare or diverge slightly outward from the base 20, making the head portion 21 somewhat larger than the base. Preferably, the lug 19 is centered on the mold parting line M of the jar (shown dot-dash in Fig. 5) so that the jar may be manufactured without the use of special molding equipment otherwise required to form the enlarged head. As especially brought out by the cross section view of Fig. 1a, the tapered side walls 23 give the lug a dovetail shape with a slight overhang at each side.

In accordance with one of the aspects of the invention a seating area is provided on the jar adjacent the protuberance 19 and the spear is provided with a mating surface. In the present instance this mating area, indicated at 28, is flat and extensive and the handle portion of the spear is also flat.

In the present instance the implement 15 comprises an extended handle portion 16, which is formed with an opening 24 dimensioned to engage the lug 19 surrounded by a top portion 25 and two spaced parallel sides 26. In carrying out the invention the resilience of the two sides 26 is augmented by providing a deep V-notch 27 at the lower end of the opening and which defines flexible extensions 26a of the sides 26. The stress concentration which would otherwise be present around the point of convergence of the two extensions 26a is relieved by providing a hole 29 through the point of convergence.

The implement 15 is made from a dimensionally stable material having a moderate degree of elasticity as for example, lucite or polystyrene plastic. It will be apparent that the resilient extensions 26a serve as spring members cooperating with the tapered sides 23 of the protuberance to produce a wedging action, caused by the natural tendency of the sides 26 to seek a position of least deformation, tending to cam the handle of the implement tightly against the seating surface 28. Full seating is assured by the low coefficient of friction between the smooth glass and plastic. Not only is the implement securely retained, but any relative twisting or skewing movement, in any plane, is stoutly resisted.

The implement which is of thin construction, is maintained in a position parallel to the jar and closely following the jar contour. The intimate relationship makes it possible for the jar to be stacked, packed and handled without catching or interference between adjacent jars and with complete safety. While a label or band of paper may be used to secure the lower end of the implement until first use, this generally is not necessary.

In use, to remove the implement from the jar it is grasped along the elongated spear portion 17 and lifted outwardly from the side of the jar 10. In so doing the implement acts as a lever fulcrumed along the top portion 25 and the outwardly flaring side walls 23 of the lug 19 exert a wedging action on the sides 26 of the implement spreading them apart. This action continues until the sides 26 are free of the head 21. To replace the implement on the jar the implement is simply snapped into place.

In the claims which follow the term "glass" is used in a generic sense to cover all moldable materials commonly used in the manufacture of containers for food.

I claim as my invention:

1. A container and implement construction comprising, in combination, a straight-sided glass jar for use with cherries, olives and the like, an outwardly protruding square shaped lug integrally formed on the side of said jar having a base portion, a head portion, spaced horizontal top and bottom walls, and spaced vertical side walls which flare or diverge slightly outward from said base making said head somewhat larger than said base, and an implement removably mounted on said lug for use in removing articles from said jar made of a resilient material and having a flat handle portion contiguous with a lower straight elongated spear portion terminating in a barbed point, said handle portion being formed with an opening engaging said lug surrounded by a top portion, two spaced parallel sides and two downwardly tapering flexible extensions which converge into said spear portion and which act to augment the resilience of said parallel sides, said parallel sides being so spaced that when in connected engagement with said lug the former will be held in a slightly spread apart position, said jar having a flat formed in the area surrounding said lug arranged so as to present a straight continuous surface against which the length of the implement is held.

2. A container and implement construction comprising, in combination, a glass jar, an outwardly protruding lug integrally formed on the side of said jar, said lug having a base portion, a head portion and spaced parallel walls which flare or diverge slightly outward from said base portion making said head portion somewhat larger than said base portion, and an implement removably mounted on said lug for use in removing contents from said jar, said implement being of resilient material and having a flat handle portion contiguous with a lower elongated portion, said handle portion having an opening therein engaging said lug, said opening being defined by a top portion, two spaced parallel sides and two tapering flexible extensions which converge from said sides into said lower elongated portion to augment the resilience of said parallel sides, said parallel sides being so spaced that when in connected engagement with said lug the former will be held in a slightly spread apart position, said jar having a flat formed in the area surrounding said lug arranged so as to present a straight continuous surface against which the length of the implement is held.

References Cited in the file of this patent

UNITED STATES PATENTS

| | | |
|---|---|---|
| 277,467 | Quillfeldt | May 15, 1883 |
| 1,327,439 | Lewis | Jan. 6, 1920 |
| 1,682,048 | Levien | Aug. 28, 1928 |